United States Patent
Xiao

(10) Patent No.: US 8,348,162 B2
(45) Date of Patent: Jan. 8, 2013

(54) FOREIGN SUBSTANCE DETECTION DEVICE FOR CARD READER AND CARD READER SOCKET

(75) Inventor: Dahai Xiao, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 13/201,683

(22) PCT Filed: Mar. 22, 2010

(86) PCT No.: PCT/CN2010/071182
§ 371 (c)(1),
(2), (4) Date: Aug. 16, 2011

(87) PCT Pub. No.: WO2010/133101
PCT Pub. Date: Nov. 25, 2010

(65) Prior Publication Data
US 2012/0048932 A1 Mar. 1, 2012

(30) Foreign Application Priority Data
May 21, 2009 (CN) .......................... 2009 1 0039657

(51) Int. Cl.
G06K 7/00 (2006.01)
G06K 5/00 (2006.01)
G06K 7/06 (2006.01)
G06K 7/10 (2006.01)
G06K 7/14 (2006.01)
G06K 19/00 (2006.01)
G07F 19/00 (2006.01)
G07D 11/00 (2006.01)
G06Q 40/00 (2012.01)

(52) U.S. Cl. ........ 235/435; 235/437; 235/439; 235/440; 235/441; 235/454; 235/379; 235/380; 235/487

(58) Field of Classification Search .................. 235/435, 235/437, 439–441, 454, 379, 380, 487
See application file for complete search history.

(56) References Cited

U.S. PATENT DOCUMENTS
6,390,367 B1 * 5/2002 Doig .............................. 235/436
(Continued)

FOREIGN PATENT DOCUMENTS
EP 1394728 A1 3/2004
(Continued)

OTHER PUBLICATIONS
International Search Report dated Jul. 1, 2010 from corresponding International Application No. PCT/CN2010/071182.

*Primary Examiner* — Daniel Walsh
(74) *Attorney, Agent, or Firm* — Wolf, Greenfield & Sacks, P.C.

(57) ABSTRACT

A foreign substance detection device for a card reader includes an emitting module (1), a receiving module (2) and a control processing module (3). The emitting module (1) is embedded on a wall surface of a card reader insertion opening (101) for emitting detection waves to a detection area (103) in front of the card reader insertion opening (101). The receiving module (2) is embedded on the wall surface of the card reader insertion opening (101) for receiving the detection waves emitted by the emitted the emitting module (1). The control processing module (3) identifies whether the receiving module (2) receives the detection wave reflected by the foreign substance in the detection area (103), and determines whether the foreign substance exists in the detection area (103) according to the determination result. A card reader socket which includes a case (100) and the foreign substance detection device is also provided.

10 Claims, 3 Drawing Sheets

U.S. PATENT DOCUMENTS

| | | | |
|---|---|---|---|
| 7,100,829 B2 * | 9/2006 | Okada | 235/439 |
| 7,143,934 B2 * | 12/2006 | Ghisani | 235/379 |
| 7,151,451 B2 * | 12/2006 | Meskens et al. | 340/552 |
| 7,483,848 B2 * | 1/2009 | Enright et al. | 705/35 |
| 7,500,609 B2 * | 3/2009 | Hirasawa et al. | 235/449 |
| 8,038,056 B2 * | 10/2011 | Ramachandran et al. | 235/379 |
| 2004/0020991 A1 * | 2/2004 | Hirasawa | 235/479 |
| 2004/0026507 A1 * | 2/2004 | Nagata et al. | 235/449 |
| 2004/0035929 A1 * | 2/2004 | Okada | 235/438 |
| 2004/0094628 A1 * | 5/2004 | Yoshii | 235/475 |
| 2004/0099728 A1 * | 5/2004 | Magee et al. | 235/379 |
| 2004/0099729 A1 * | 5/2004 | Utz et al. | 235/379 |
| 2004/0124240 A1 * | 7/2004 | Utz et al. | 235/379 |
| 2004/0129772 A1 * | 7/2004 | Ramachandran et al. | 235/379 |
| 2004/0141058 A1 * | 7/2004 | Ramachandran et al. | 348/150 |
| 2004/0171373 A1 * | 9/2004 | Suda et al. | 455/415 |
| 2004/0200894 A1 * | 10/2004 | Ramachandran et al. | 235/379 |
| 2005/0006465 A1 * | 1/2005 | Ghisani | 235/381 |
| 2005/0151645 A1 * | 7/2005 | Meskens et al. | 340/552 |
| 2006/0118624 A1 * | 6/2006 | Kelso et al. | 235/444 |
| 2006/0138241 A1 * | 6/2006 | Kitazawa | 235/475 |
| 2006/0169764 A1 * | 8/2006 | Ross et al. | 235/375 |
| 2007/0030124 A1 * | 2/2007 | Lee | 340/10.1 |
| 2007/0040023 A1 * | 2/2007 | Ruggirello et al. | 235/382 |
| 2007/0057070 A1 * | 3/2007 | Scarafile et al. | 235/475 |
| 2007/0080225 A1 * | 4/2007 | Hirasawa et al. | 235/449 |
| 2008/0142595 A1 * | 6/2008 | Clark et al. | 235/454 |
| 2009/0221232 A1 * | 9/2009 | Estevez et al. | 455/41.1 |
| 2011/0006112 A1 * | 1/2011 | Mueller | 235/379 |

FOREIGN PATENT DOCUMENTS

WO  WO 2008/005705 A1  5/2008

* cited by examiner

FOREIGN SUBSTANCE DETECTION DEVICE FOR CARD READER AND CARD READER SOCKET

This application claims priority to Chinese Patent Application No. 200910039657.8, filed with the Chinese Patent Office on May 21, 2009 and entitled "Device for detecting foreign matter of card reader and a card reader socket", which is hereby incorporated by reference in its entirety.

FIELD OF THE INVENTION

The present invention relates to the field of monitoring and in particular to a device for detecting a foreign matter of a card reader and a card reader socket.

BACKGROUND OF THE INVENTION

A 24-hour self-help Automatic Teller Machine (ATM) has brought much convenience to people along with wide applications thereof, but an increasing number of accompanying ATM dispute cases and ATM commercial crimes also have emerged. Particularly, a category of severe and secret crimes is to embezzle bank card information. A common crime is to stick a falsified card reader socket to a card reader port or another crucial portion of the ATM and to embezzle a bank card or information thereof directly via the falsified card reader socket, thereby causing a great loss to the benefit of both a user and a bank. Therefore, how to secure the operation of an ATM and the benefit of the bank and the depositor has been an issue to be addressed critically in the finance industry today.

At present, a solution to a crime case of sticking a foreign matter to an ATM to embezzle bank card information is as follows. An additional optical sensor is installed on the exterior surface of a card socket of a card reader, to detect a foreign matter through the optical sensor and to generate in real time a foreign matter alarm signal. This detection socket of a card reader against a foreign matter has the function of detecting a foreign matter to thereby prevent effectively a foreign matter from being stuck by a criminal to the card reader socket without influencing normal use by a user.

The inventors have found in making the invention that the foregoing existing detection socket of a card reader against a foreign matter has the following drawbacks.

When the existing detection socket of a card reader against a foreign matter is in use during winter in the north, a window of the optical sensor tends to be frosted due to direct exposure of the optical sensor on the exterior surface of the card socket of the card reader, causing an incorrect alarm of the detection function.

SUMMARY OF THE INVENTION

A technical problem to be addressed by the invention is to provide a device for detecting a foreign matter of a card reader and a card reader socket to overcome an influence of a weather factor, e.g., rain, snow, frost, clotted dew, moderate dust, etc., for automatic detection of a foreign matter of the card reader.

In order to address the foregoing technical problem, an embodiment of the invention proposes a device for detecting a foreign matter of a card reader, which includes: an emission module embedded in a wall of a card socket of the card reader and adapted to emit a detection wave to a detection area in front of the card socket of the card reader; a reception module embedded in the wall of the card socket of the card reader and adapted to receive the detection wave emitting from the emission module; and a control processing module adapted to determine whether the reception module receives the detection wave reflected by a foreign matter in the detection area and to determine from a determination result whether a foreign matter is present in the detection area.

Correspondingly, an embodiment of the invention further proposes a card reader socket adapted to be installed outside a card reader of an automatic teller machine and in communication with the card reader, wherein the card reader socket includes a casing and a device for detecting a foreign matter of the card reader;

the casing is installed outside the card reader and is arranged with a card slot in communication with the card reader and for insertion of a magnetic card; and one half of the casing corresponding to a magnetic strip of the inserted magnetic card is recessed in the direction of inserting the card to form a hollow detection area, and the other half thereof is extended in the direction of removing the card to form a protruding stage; and the device for detecting a foreign matter of the card reader includes:

a detection wave receiver embedded on and flush with the front wall of the card socket at an end of the casing corresponding to the magnetic strip of the inserted magnetic card, with its reception side facing the detection area and adapted to receive the detection wave emitted from the detection area;

a first detection wave emitter, together with the detection wave receiver, embedded side by side in and flush with the front wall of the card socket of the casing, with its emission side facing the detection area and adapted to emit to the detection area a first detection wave which is not received by the detection wave receiver without being reflected by a foreign matter; and a second detection wave emitter embedded in the side wall of the protruding stage adjacent to the detection area, with its emission side facing the detection wave receiver and adapted to emit to the detection area a second detection wave which traverses the detection area and is received by the detection wave receiver without being reflected by a foreign matter; and a controller circuit connected with the detection wave receiver and adapted to determine whether the detection wave receiver receives the first detection wave reflected by a foreign matter in the detection area, and if so, then to determine presence of a foreign matter in the detection area; otherwise, to determine whether the detection wave receiver receives the second detection wave, and if so, then to determine absence of a foreign matter in the detection area; otherwise, to determine that the second detection wave is reflected by a foreign matter present in the detection area.

The embodiments of the invention are implemented with the following advantageous effects.

In the device for detecting a foreign object of a card reader and the card reader socket according to the embodiments of the invention, the sensor components are embedded in the wall of the card socket of the card reader and adapted to emit to the detection area in front of the card socket and receive the detection wave, and whether a foreign object is present in the detection area can be determined from whether the detection wave reflected by the foreign object is received. The embodiments of the invention can overcome an influence of a weather factor, e.g., rain, snow, frost, clotted dew, moderate dust, etc., for automatic detection of a foreign matter in the card reader. The embodiments of the invention can be applied to an automatic teller machine to prevent a crime of installing a foreign object on a card reader and thereby avoid a loss of the benefit of a user or a bank.

BRIEF DESCRIPTION OF THE DRAWINGS

The drawings for descriptions of the embodiments of the invention or the prior art will be described briefly below to make the technical solutions in the embodiments or in the prior art more apparent. Evidently, the drawings below are merely illustrative of some embodiments of the invention, and those ordinarily skilled in the art can derive from these drawings other drawings without any inventive effort.

DETAILED DESCRIPTION OF THE INVENTION

The technical solutions in the embodiments of the invention will be described clearly and fully below with reference to the drawings in the embodiments of the invention. Evidently, the described embodiments are merely a part but not all of the embodiments of the invention. Based upon the embodiments of the invention here, any other embodiments which will occur to those ordinarily skilled in the art without any inventive effort shall fall into the claimed scope of the invention.

Figure 1:
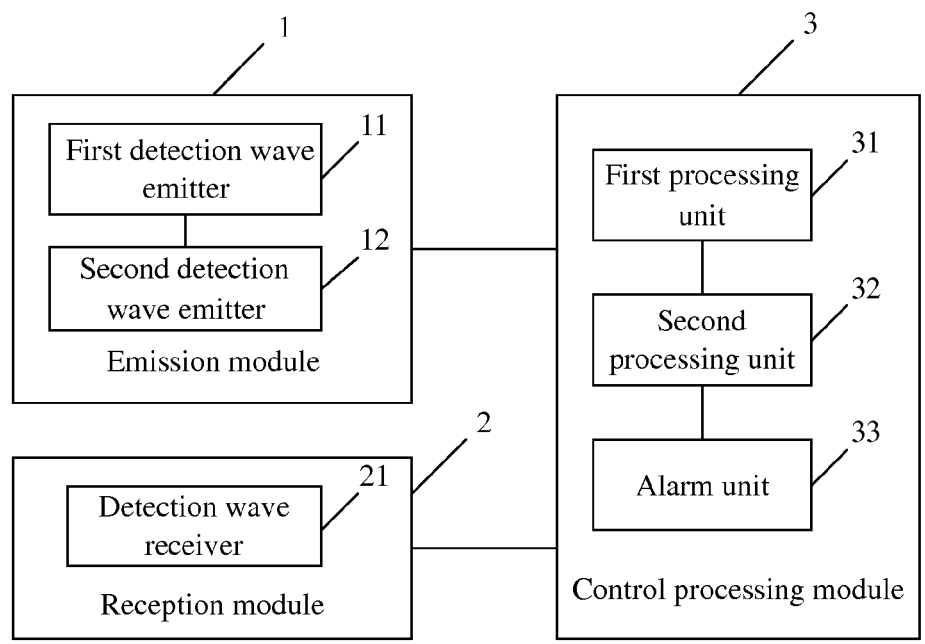
FIG. 1 is a schematic structural diagram illustrating a device for detecting a foreign matter of a card reader according to an embodiment of the invention.

Reference is made to FIG. 1 which is a schematic structural diagram illustrating a device for detecting a foreign matter of a card reader according to a first embodiment of the invention.

The device for detecting a foreign matter of a card reader according to the embodiment of the invention includes an emission module 1, a reception module 2 and a control processing module 3.

Particularly, the emission module 1 is embedded in a wall of a card socket of the card reader and adapted to emit a detection wave to a detection area in front of the card socket.

The reception module 2 is embedded in the wall of the card socket of the card reader and adapted to receive the detection wave emitting from the emission module.

A control processing module 3 is connected with the reception module 2 and adapted to determine whether the reception module 2 receives the detection wave reflected by a foreign matter in the detection area and to determine from a determination result whether a foreign matter is present in the detection area.

Specifically, as illustrated in FIG. 1, the reception module 2 includes a detection wave receiver 21 which is embedded in and parallel to the front wall of the card socket of the card reader, which has its light reception side facing the detection area and which is adapted to receive the detection wave emitting from the emission module 1.

The emission module 1 includes a first detection wave emitter 11 which is embedded in and parallel to the front wall of the card socket of the card reader, which has its light emission side facing the detection area and which is adapted to emit a first detection wave to the detection area.

In an embodiment, the first detection wave emitter 11 and the detection wave receiver 21 can be embedded side by side in and flush with the front wall of the card socket of the card reader. The first detection wave emitting from the first detection wave emitter 11 to the detection area in front without being reflected by a foreign matter will not be received by the detection wave receiver 21 due to a limited light reception angle of the detection wave receiver 21.

The control processing module 3 particularly includes a first processing unit 31 adapted to determine whether the detection wave receiver receives the first detection wave reflected by a foreign matter in the detection area and if so, then to determine presence of a foreign matter in the detection area.

In a specific application scenario, when a foreign matter in the detection area abuts against the first detection wave emitter 11 or the detection wave receiver 21, light emitting from the first detection wave emitter 11 can not enter into the reception angle of the detection wave receiver 21 after being reflected by the foreign matter, so that no foreign matter can be detected. Therefore, the emission module 1 in the device for detecting a foreign matter of a card reader according to an embodiment of the invention further includes a second detection wave emitter 12 which is embedded in the front wall of the card socket of the card reader, which has its emission side facing the detection wave receiver 21 and which is adapted to emit a second detection wave to the detection area. With absence of a foreign matter in the detection area, the second detection wave can traverse directly the detection area and enter into the light reception angle of the detection wave receiver 21 and be received by the detection wave receiver 21. When a foreign matter is present in the detection area, the second detection wave will be reflected by the foreign matter and can not be received by the detection wave receiver 21.

As illustrated in FIG. 1, the control processing module 3 further includes a second processing unit 32 adapted to determine whether the detection wave receiver 21 receives the second detection wave when the first processing unit 31 determines no reception of the first detection wave reflected by a foreign matter in the detection area, and if so, then to determine that there is no foreign matter in the detection area, and otherwise, to determine that the second detection wave is reflected by a foreign matter present in the detection area.

Moreover, the control processing module 3 further includes an alarm unit 33 adapted to generate an alarm signal when the first processing unit 31 or the second processing unit 32 determines presence of a foreign matter in the detection area.

In an embodiment, the first detection wave emitter 11 and the second detection wave emitter 12 can be implemented with a light emitting device with a wavelength range in the near infrared spectrum band, e.g., a Light Emitting Diode (LED), etc. The detection wave receiver 21 can be implemented with a photoelectric sensor, e.g., a photodiode (PD). Alternatively, the first detection wave emitter 11 and the second detection wave emitter 12 can be implemented with an ultrasonic wave emitter, and the detection wave receiver 21 can be implemented with an ultrasonic wave receiver. The control processing module 3 can determine whether the detection wave receiver 21 receives the detection wave from the response of the detection wave receiver 21 to the detection wave.

Descriptions will be given below of an example in which the device for detecting a foreign matter of a card reader according to the embodiment of the invention is applied to an automatic teller machine for automatic detection of a foreign matter in the card reader of the automatic teller machine.

Figure 2:
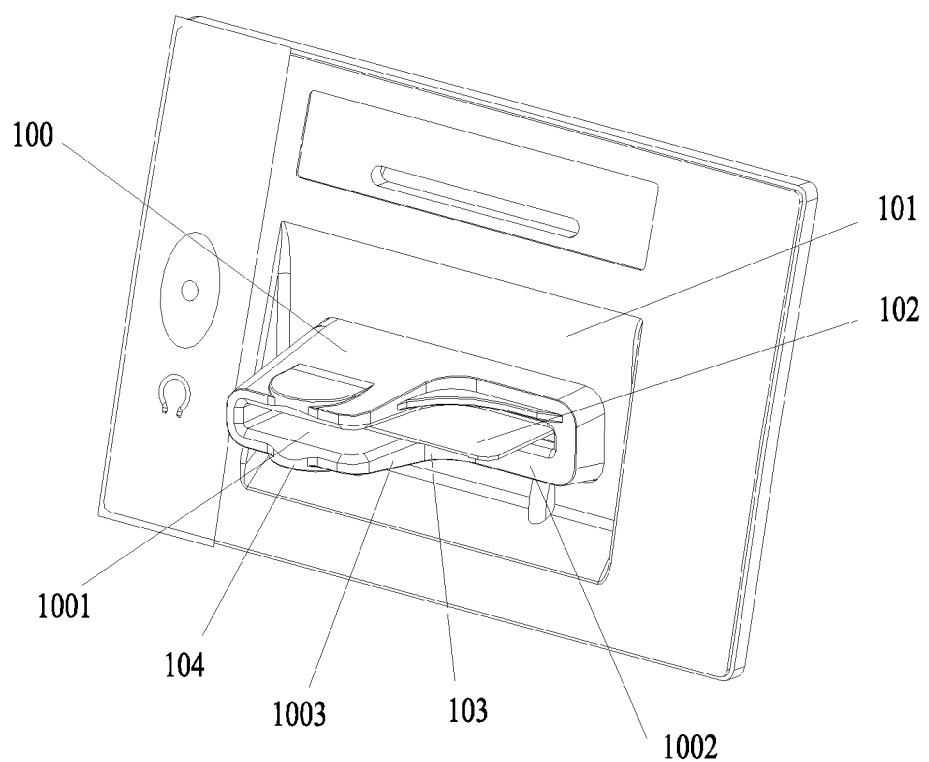
FIG. 2 is a schematic diagram illustrating a card reader socket according to an embodiment of the invention applied to an automatic teller machine.

Reference is made to FIG. 2 which is a schematic diagram illustrating a card reader socket according to an embodiment of the invention applied to an automatic teller machine.

The embodiment of the invention provides a card reader socket applied to an automatic teller machine, which includes a casing and a device for detecting a foreign matter of the card reader, adapted to detect a foreign matter of a card reader and particularly including a first detection wave emitter, a second detection wave emitter, a detection wave receiver and a controller circuit.

As illustrated in FIG. 2, the casing 100 of the card reader socket is installed protruding at a card insertion portion 101 outside the card reader of the automatic teller machine and is arranged with a card slot 1001 in communication with the card reader of the automatic teller machine and for insertion of a magnetic card. The magnetic card 102 is inserted into the card reader through the card slot 1001. A portion of the front end of the casing 100 of the card reader socket corresponding to a magnetic strip of the inserted magnetic card 102 is further arranged with an indentation, so that one half of the casing corresponding to the magnetic strip of the magnetic card 102 is recessed in the direction of inserting the card to form a hollow detection area 103, and the other half thereof is extended in the direction of removing the card to form a protruding stage 104. A wall of the card socket adjacent to the detection area 103 includes the front wall 1002 of the card socket at an end corresponding to the magnetic strip of the inserted magnetic card 102 and the side wall 1003 of the protruding stage 104 adjacent to the detection area 103.

Figure 3:
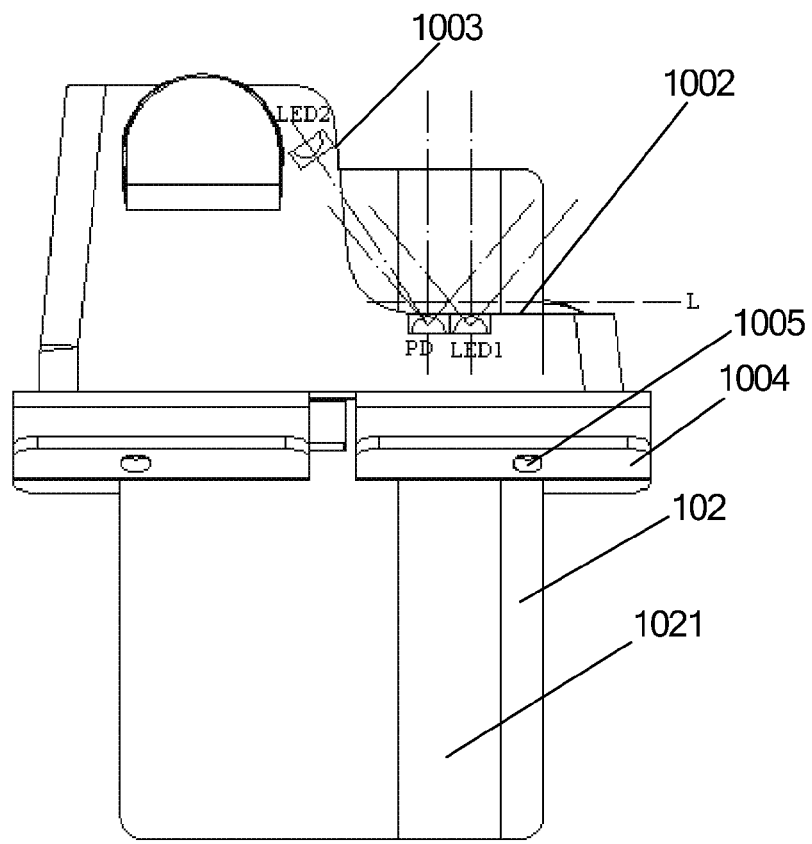
FIG. 3 is a top view illustrating the card reader socket as illustrated in FIG. 2.

Reference is made to FIG. 3 which is a top view illustrating the card socket illustrated in FIG. 2. The casing 100 of the card socket is arranged with a base 1004 attached thereto or integrally formed therewith, and the base 1004 is installed on the card insertion portion 101 of the automatic teller machine via installation holes 1005 and connected with the card reader of the automatic teller machine conveniently, simply and firmly.

The detection area 103 illustrated in FIG. 2 is located in front of the card socket and corresponds to the portion of the magnetic strip 1021 of the magnetic card 102. Therefore, the detection area 103 is a crucial portion where a criminal installs a foreign matter to embezzle the magnetic card or card information thereof. Detection of a foreign matter in the detection area 103 can prevent effectively a crime from embezzling the magnetic card or card information thereof.

In an embodiment of the invention, the first and second detection wave emitters can be implemented with a light emitting device with a wavelength range in the near infrared spectrum band, and the detection wave receiver can be implemented with a photodiode with a wavelength range in the near infrared spectrum band. Hereinafter, the first detection wave emitter will be referred to as LED1, and the detection wave emitting therefrom will be referred to as the first detection light. The second detection wave emitter will be referred to as LED2, and the detection wave emitting therefrom will be referred to as the second detection light. The detection wave receiver will be referred to as PD. As illustrated in FIG. 3, in order to achieve appropriate light emission and reception angles and improve secrecy of the detector, the LED1 and the PD are embedded side by side in and flush with the front wall 1002 of the card socket, the LED1 has its emission side facing the detection area 103 in the front of the card socket and is adapted to emit the first detection light to the detection area 103. The PD has its light reception side facing the detection area and is adapted to receive the detection light emitting from the detection area. The LED2 is embedded in the side wall 1003 of the protruding stage 104, has its emission side facing to the PD and is adapted to emit the second detection light to the detection area 103.

In a normal case where no foreign matter is present in the detection area, the first detection light emitting from the LED1 without being reflected by a foreign matter can neither enter into the reception angle of the PD nor be received by the PD; and the second detection light emitting from the LED2 without being reflected by a foreign matter can traverse directly the detection area and be received by the PD. In the case where a foreign matter is present in the detection area, the first detection light emitting from the LED 1 can enter into the reception angle of the PD and be received by the PD after being reflected by the foreign matter; and after being reflected by the foreign matter, the second detection light emitting from the LED2 can neither enter into the reception angle of the PD nor be received by the PD due to the limited reception angle of the PD.

The PD can convert an optical signal into an electric signal, and the controller circuit can detect whether the PD responds to the optical signal to determine whether the PD receives the detection light emitting from the LED1 or the LED2, thereby determining whether a foreign matter is present in the detection area.

Specifically, in an embodiment of the invention, the controller circuit can control light emission statuses of the LED1 and the LED2 so that the LED1 and the LED2 emit light alternately to thereby distinguish the detection light emitting from the LED1 and the LED2. During the time period of light emission of the LED1, whether the light emitting from the LED1 is reflected by a foreign matter can be determined from a light reception condition of the PD. Likewise, during the time period of light emission of the LED2, whether the light emitting from the LED2 is reflected by a foreign matter can be determined from a light reception condition of the PD. Therefore, whether a foreign matter is present in the detection area can be determined from the light emission statuses of the LED1 and the LED2 and the light reception condition of the PD.

The benefit of a user or a bank may be subject to a great loss when a criminal installs a foreign matter on the automatic teller machine, e.g., installs a falsified card reader socket on the automatic teller machine for the purpose of embezzling a bank card or card information thereof. In the embodiment of the invention, the controller circuit can trigger a timely alarm upon detection of the foreign matter, thereby avoiding the loss of the benefit of the user or the bank.

Figure 4:
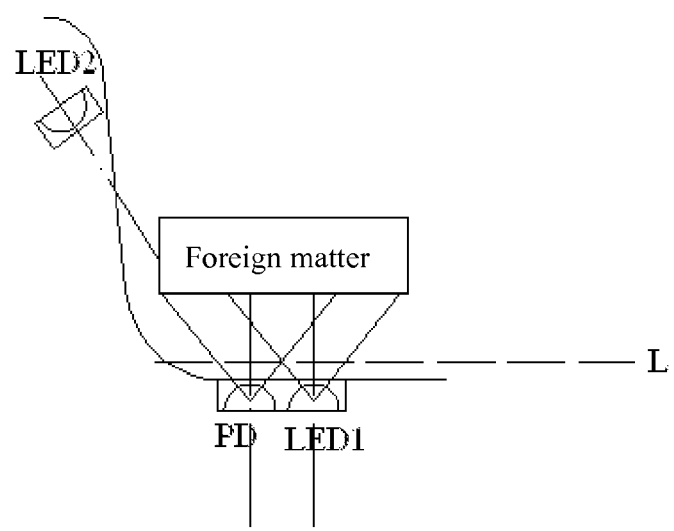
FIG. 4 is a schematic diagram illustrating a first application scenario of the card reader socket as illustrated in FIG. 2.

Reference is made to FIG. 4 illustrating a first application scenario of the embodiment of the invention. A foreign matter out of an area L, which is an area in the detection area close to the LED1 and the PD, is present in the detection area. During a period of time in which the LED 1 emits light, the first detection light emitting from the LED 1 will be reflected by the foreign matter and then can enter into the light reception angle of the PD and be received by the PD. At this time, the system can determine presence of the foreign matter in the detection area, without the need of determining whether the second detection light emitting from the LED2 can be received by the PD, and trigger an alarm through the controller circuit.

Figure 5:
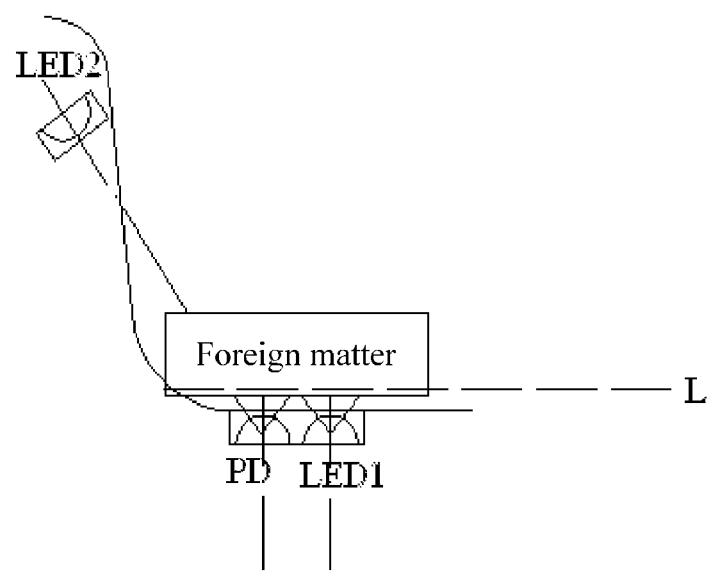
FIG. 5 is a schematic diagram illustrating a second application scenario of the card reader socket as illustrated in FIG. 2.

Reference is made to FIG. 5 illustrating a second application scenario of the embodiment of the invention. A foreign matter lying in the area L and shielding the LED 1 and the PD is present in the detection area. At this time, during a period of time in which the LED1 emits light, the first detection light emitting from the LED1, although being reflected by the foreign matter, can not be received by the PD due to the limited light reception angle of the PD. Therefore, the system will determine whether the second detection light from the LED2 can be received by the PD. As illustrated in FIG. 5, when the foreign matter lies in the area L, the light emitting from the LED1 will be reflected by the foreign matter and can not be received by the PD. At this time, however, the light emitting from the LED2 alike will be reflected by the foreign matter and can not be received by the PD. Therefore, presence of the foreign matter in the detection area can be determined, and the controller circuit can trigger an alarm.

Figure 6:
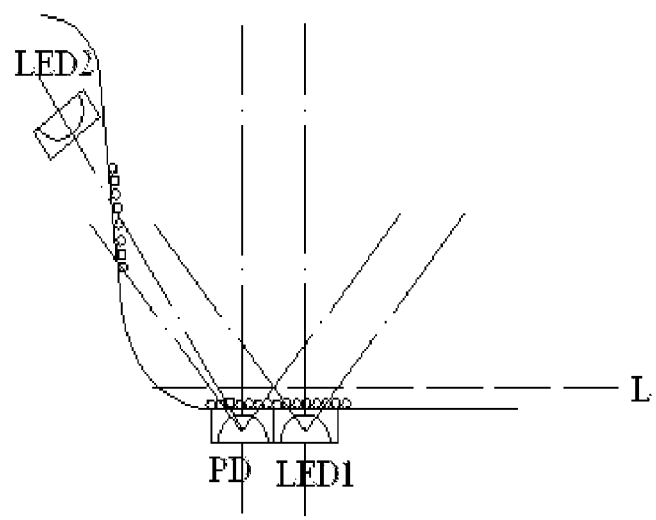
FIG. 6 is a schematic diagram illustrating a third application scenario of the card reader socket as illustrated in FIG. 2.

Reference is made to FIG. 6 illustrating a third application scenario of the embodiment of the invention. An interference factor of minute objects including rain, snow, frost, clotted dew, moderate dust, etc., is present in the detection area. Although the interference factor attached to exterior surfaces of optical windows of the LED1 and the PD may interfere the normal prorogation direction of light, the light emission and reception angles of the optical devices LED1, LED2 and PD can be arranged reasonably so that most of the light emitting from the LED1 after being scattered by the interference factor can not enter into the reception angle of the PD and can not be received by the PD. And, the light emitting from the LED2 can partially enter into the reception angle of the PD even after being scattered by the interference factor on the surface of the PD, and therefore the PD still can respond to the light from the LED2. Moreover, the LED1, the LED2 and the PD are preferably optical devices with a wavelength range in the near infrared spectrum band and with high light penetration. Therefore, the card reader socket according to the embodiment of the invention can accommodate interference of minute objects including rain, snow, frost, clotted dew, moderate dust, etc., and will not trigger any incorrect alarm on a foreign matter due to a weather factor.

Moreover, an alarm will be triggered when the PD can not respond to the light emitting from the LED2 in the case where the optical window is covered with any object of nontransparent material with malice to disable the optical sensor or the card socket is damaged with malice. If the coverage object is nearly transparent, then detection of a foreign object from the outside will not be frustrated although no alarm is triggered.

According to the embodiment of the invention, the card reader socket is adapted to be installed outside and in communication with the card reader of the automatic teller machine so that the optical devices are embedded in the wall of the card socket. The detection light with a wavelength range in the near infrared spectrum band emits toward the detection area in front of the card socket and then is received. Whether a foreign object is present in the detection area can be determined from whether the detection light reflected by the foreign object is received, thereby overcoming an influence of a weather factor, e.g., rain, snow, frost, clotted dew, moderate dust, etc., for automatic detection of a foreign matter in the card reader. Thus, a crime of installing a foreign object on the card reader of the automatic teller machine is prevented effectively.

The device for detecting a foreign object of a card reader according to an embodiment of the invention applied in an automatic teller machine has been described as above in an example where the detection wave emitters are implemented with a light emitting diode with a wavelength range in the near infrared spectrum band and the detection wave receiver is implemented with an photodiode. Those skilled in the art can appreciate that the detection wave emitters and receiver according to an embodiment of the invention can alternatively be implemented with an optical device in another wavelength range, e.g., of ultraviolet or visible light, and the detection wave emitters and receiver can also be replaced with another sensor component sensitive to a foreign object, e.g., an ultrasonic wave emitter, an ultrasonic wave detector, etc., without departing from the spirit of the invention.

In the device for detecting a foreign object of a card reader and the card reader socket according to an embodiment of the invention, the sensor components are embedded in the wall of the card socket of the card reader and arranged reasonably with emission and reception angles to emit to the detection area in front of the card socket and receive the detection wave, and whether a foreign object is present in the detection area can be determined from whether the detection wave reflected by the foreign object is received. An embodiment of the invention can overcome an influence of a weather factor, e.g., rain, snow, frost, clotted dew, moderate dust, etc., for automatic detection of a foreign matter in the card reader. An embodiment of the invention can be applied to an automatic teller machine to prevent a crime of installing a foreign object on a card reader, thereby avoiding a loss of the benefit of a user or a bank.

The foregoing descriptions are merely illustrative of the preferred embodiments of the invention. It shall be noted that those ordinarily skilled in the art can further make a number of adaptations and modifications to those embodiments of the invention without departing from the spirit of the invention, and these adaptations and modifications shall also be considered as coming into the scope of the invention as claimed in the appended claims.

The invention claimed is:

1. A device for detecting a foreign object of a card reader, comprising:

an emission module embedded in a wall of a card socket of the card reader and adapted to emit a detection wave to a detection area in front of the card socket of the card reader;

a reception module embedded in the wall of the card socket of the card reader and adapted to receive the detection wave emitting from the emission module; and a control processing module adapted to determine whether the reception module receives the detection wave reflected by a foreign matter in the detection area and to determine from a determination result whether the foreign matter is present in the detection area; wherein:

the reception module comprises a detection wave receiver embedded in and flush with a front wall of the card socket of the card reader, with a reception side of the detection wave receiver facing the detection area, the detection wave receiver adapted to receive the detection wave emitting from the emission module and reflected by the foreign matter;

the emission module comprises a second detection wave emitter embedded in the front wall of the card socket of the card reader, with an emission side of the second detection wave emitter facing the detection wave receiver, the second detection wave emitter adapted to emit to the detection area a second detection wave which traverses the detection area and is received by the detection wave receiver when it is not reflected by the foreign matter; and the control processing module comprises a second processing unit adapted to:

determine whether the wave detection receiver receives the second detection wave, if the second processing unit determines that the wave detection receiver receives the second detection wave, determine absence of the foreign matter in the detection area, and if the second processing unit determines that the wave detection receiver does not receive the second detection wave, determine that the second detection wave is reflected by the foreign matter present in the detection area.

2. The device for detecting a foreign object of a card reader according to claim 1, wherein the emission module further comprises:
a first detection wave emitter, together with the detection wave receiver, embedded side by side in and flush with the front wall of the card socket of the card reader, with an emission side of the first detection wave emitter facing the detection area and adapted to emit to the detection area a first detection wave which is not received by the detection wave receiver without being reflected by the foreign matter.

3. The device for detecting a foreign object of a card reader according to claim 2, wherein the control processing module further comprises:
a first processing unit adapted to:
determine whether the detection wave receiver receives a first detection wave reflected by the foreign matter in the detection area,
if the first processing unit determines that the detection wave receiver receives the first detection wave, determine presence of the foreign matter in the detection area; and
if the first processing unit determines that the detection wave receiver does not receive the first detection wave, the first processing unit is further adapted to:
determine whether the wave detection receiver receives the second detection wave,
if the first processing unit determines that the wave detection receiver receives the second detection wave, determine absence of the foreign matter in the detection area, and
if the first processing unit determines that the wave detection receiver does not receive the second detection wave, determine that the second detection wave is reflected by the foreign matter present in the detection area.

4. The device for detecting a foreign object of a card reader according to claim 3, wherein the control processing module further comprises:
an alarm unit adapted to generate an alarm signal when the first or second processing unit determines presence of the foreign matter in the detection area.

5. The device for detecting a foreign object of a card reader according to claim 4, wherein the first and second detection wave emitters are light emitting diodes with a wave range in the near infrared spectrum band, and the detection wave receiver is a photodiode.

6. The device for detecting a foreign object of a card reader according to claim 4, wherein the first and second detection wave emitters are ultrasonic wave emitters, and the detection wave receiver is a ultrasonic wave receiver.

7. The device for detecting a foreign object of a card reader according to claim 3, wherein the first and second detection wave emitters are light emitting diodes with a wave range in the near infrared spectrum band, and the detection wave receiver is a photodiode.

8. The device for detecting a foreign object of a card reader according to claim 3, wherein the first and second detection wave emitters are ultrasonic wave emitters, and the detection wave receiver is an ultrasonic wave receiver.

9. A card reader socket adapted to be installed outside a card reader of an automatic teller machine and in communication with the card reader, wherein the card reader socket comprises a casing and a device for detecting a foreign matter of the card reader, wherein:
the casing is installed outside the card reader and is arranged with a card slot in communication with the card reader and for insertion of a magnetic card;
one half of the casing corresponding to a magnetic strip of the inserted magnetic card is recessed in the direction of inserting the card to form a hollow detection area, and the other half thereof is extended in the direction of removing the card to form a protruding stage; and
the device for detecting the foreign matter of the card reader comprises:
a detection wave receiver embedded on and flush with a front wall of the card socket at an end of the casing corresponding to the magnetic strip of the inserted magnetic card, with a reception side of the detection wave receiver facing the detection area and adapted to receive a second detection wave emitted from a second detection wave emitter to the detection area;
the second detection wave emitter embedded in the side wall of the protruding stage adjacent to the detection area, with an emission side of the second detection wave emitter facing the detection wave receiver and adapted to emit to the detection area the second detection wave which traverses the detection area and is received by the detection wave receiver when it is not reflected by the foreign matter; and
a controller circuit connected with the detection wave receiver and adapted to:
determine whether the detection wave receiver receives the second detection wave traversing the detection area without being reflected by the foreign matter,
if the controller circuit determines that the detection wave receiver receives the second detection wave, determine absence of the foreign matter in the detection area, and
if the controller circuit determines that the detection wave receiver does not receive the second detection wave, determine that the second detection wave is reflected by the foreign matter present in the detection area.

10. The card reader socket according to claim 9, wherein the device for detecting a foreign matter of the card reader further comprises:
a first detection wave emitter, together with the detection wave receiver, embedded side by side in and flush with the front wall of the card socket of the casing, with its emission side facing the detection area and adapted to emit to the detection area a first detection wave which is not received by the detection wave receiver without being reflected by the foreign matter; and
the controller circuit connected with the detection wave receiver and adapted to determine whether the detection wave receiver receives the first detection wave reflected by a foreign matter in the detection area, and if so, then to determine presence of the foreign matter in the detection area; otherwise, to determine whether the detection wave receiver receives the second detection wave, and if so, then to determine absence of the foreign matter in the detection area; otherwise, to determine that the second detection wave is reflected by the foreign matter present in the detection area.

* * * * *